United States Patent
Sivapornsatain (10) Patent No.: US 11,733,944 B2
(45) Date of Patent: Aug. 22, 2023

(54) PRINTER, ONLY WHEN AUTHENTICATION IS SUCCESSFUL, ENABLES COMMAND FOR SET PERIOD OF TIME TO ACQUIRE DATA AND DISABLES COMMAND AFTER PERIOD OF TIME ELAPSES, COMMUNICATION METHOD, ENCRYPTION METHOD, AND NON-TRANSITORY COMPUTER-READABLE RECORDING MEDIUM

(71) Applicant: SATO HOLDINGS KABUSHIKI KAISHA, Tokyo (JP)

(72) Inventor: Sumate Sivapornsatain, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/979,566

(22) PCT Filed: May 29, 2019

(86) PCT No.: PCT/JP2019/021417
§ 371 (c)(1),
(2) Date: Sep. 10, 2020

(87) PCT Pub. No.: WO2020/054140
PCT Pub. Date: Mar. 19, 2020

(65) Prior Publication Data
US 2021/0011674 A1    Jan. 14, 2021

(30) Foreign Application Priority Data

Sep. 11, 2018  (JP) ................................. 2018-169925
Sep. 11, 2018  (JP) ................................. 2018-169933

(51) Int. Cl.
*G06F 3/12*         (2006.01)
*B41J 3/407*       (2006.01)
(Continued)

(52) U.S. Cl.
CPC .......... *G06F 3/1238* (2013.01); *B41J 3/4075* (2013.01); *B41J 29/38* (2013.01); *G06F 3/1222* (2013.01);
(Continued)

(58) Field of Classification Search
None
See application file for complete search history.

(56) References Cited

U.S. PATENT DOCUMENTS 8,151,362 B2 *  4/2012  Miyamoto .......... G06F 21/6218
                                                              726/28
2008/0120610 A1  5/2008  Katano et al.
(Continued)

FOREIGN PATENT DOCUMENTS

EP    2 770 720 A1    8/2014
JP    2002-259108 A   9/2002
(Continued)

OTHER PUBLICATIONS

Partial Supplementary European Search Report, Application No. 19861009.9, dated Oct. 7, 2021, 11 pages.
(Continued)

*Primary Examiner* — Haris Sabah
(74) *Attorney, Agent, or Firm* — Foley & Lardner LLP (57) ABSTRACT

A printer capable of communicating with an external apparatus is proposed. The printer includes: a processing unit configured to executing one of commands to perform corresponding processing with regard to the printer; a disabling unit configured to disable a first command among the commands, the first command to acquire data from the external apparatus; a determining unit configured to determine whether an authentication result is successful based on predetermined code information; and an enabling unit con-
(Continued)

figured to enable the first command for a period of time, when the authentication result has been successful.

6 Claims, 10 Drawing Sheets

(51) Int. Cl.

|   |   |   |
|---|---|---|
| *B41J 29/38* | (2006.01) | |
| *G06F 21/60* | (2013.01) | |
| *H04L 9/08* | (2006.01) | |
| *H04L 9/32* | (2006.01) | |
| *H04L 9/40* | (2022.01) | |
| *G06F 21/34* | (2013.01) | |
| *H04N 1/00* | (2006.01) | |

(52) U.S. Cl.
CPC .......... *G06F 3/1288* (2013.01); *G06F 21/608* (2013.01); *H04L 9/0869* (2013.01); *H04L 9/3228* (2013.01); *H04L 9/3268* (2013.01); *G06F 21/34* (2013.01); *H04L 63/0853* (2013.01); *H04N 1/00209* (2013.01)

(56) References Cited

U.S. PATENT DOCUMENTS

| | | | |
|---|---|---|---|
| 2009/0235363 | A1 | 9/2009 | Tomita |
| 2012/0293819 | A1* | 11/2012 | Doui ................... H04L 63/083 358/1.13 |
| 2013/0070282 | A1 | 3/2013 | Takahashi |
| 2013/0222840 | A1* | 8/2013 | Hosoda .............. H04N 1/00204 358/1.14 |
| 2013/0342865 | A1* | 12/2013 | Shekher ................ G06F 3/1292 358/1.14 |
| 2015/0234624 | A1* | 8/2015 | Nii ........................ G06F 3/1222 358/1.14 |
| 2015/0381840 | A1 | 12/2015 | Takemura et al. |
| 2017/0272896 | A1* | 9/2017 | Suzuki ................ H04B 5/0031 |
| 2018/0239570 | A1* | 8/2018 | Mizuno ................ G06F 3/1222 |
| 2018/0260175 | A1* | 9/2018 | Watanabe ............. G06F 3/1238 |

FOREIGN PATENT DOCUMENTS

| | | |
|---|---|---|
| JP | 2003-91240 A | 3/2003 |
| JP | 2007-3900 A | 1/2007 |
| JP | 2008-129788 A | 6/2008 |
| JP | 2009-224826 A | 10/2009 |
| JP | 2010-217604 A | 9/2010 |
| JP | 2010-219883 A | 9/2010 |
| JP | 2014-138308 A | 7/2014 |

OTHER PUBLICATIONS

Japanese Office Action, Japanese Application No. 2018-169925, and English translation, dated Oct. 11, 2022.

European Office Action issued in connection with EP Appl. Ser. No. 19861009.9 dated Jun. 12, 2023.

* cited by examiner

Generation of Encryption key

Encryption of Server certificate and Private key

PRINTER, ONLY WHEN AUTHENTICATION IS SUCCESSFUL, ENABLES COMMAND FOR SET PERIOD OF TIME TO ACQUIRE DATA AND DISABLES COMMAND AFTER PERIOD OF TIME ELAPSES, COMMUNICATION METHOD, ENCRYPTION METHOD, AND NON-TRANSITORY COMPUTER-READABLE RECORDING MEDIUM

TECHNICAL FIELD

A present disclosure relates to a printer, a communication method, an encryption method and a computer-readable recording medium.

BACKGROUND ART

Conventionally, it has been known encrypted communication between a client terminal, which requests to performs printing, and a printer, in order to enhance security with regard to printing performed by the printer. For instance, Japanese laid-open patent publication 2002-259108 discloses a print system in which a printer has a public key certificate and the corresponding private key, and printer authentication is performed based on the public key certificate in response to a request from a document server or a user client.

SUMMARY OF THE INVENTION

Problems to be Solved by the Invention

Incidentally, it is preferable in conventional systems that data required for encrypted communication, such as a public key certificate and a private key, be updated timely to maintain communication security. Here, it is demanded in light of convenience that data required for encrypted communication can be downloaded to a printer via network.

In the other perspective, the print system disclosed in the Japanese laid-open patent publication 2002-259108 records a public key certificate and a private key in a memory as they are, and hence vulnerable against external unauthorized access.

In view of the above, the present invention generally aims to enhance printer security.

More specifically, an embodiment of the present invention aims to be able to securely download, via network, data required for encrypted communication to a printer. Another embodiment of the present invention aims to enhance printer security when the printer performs printing based on communication with an external apparatus.

Means for Solving the Problems

An embodiment according to the present invention is a printer capable of communicating with an external apparatus. The printer includes: a processing unit configured to executing one of commands to perform corresponding processing with regard to the printer; a disabling unit configured to disable a first command among the commands, the first command to acquire data from the external apparatus; a determining unit configured to determine whether an authentication result is successful based on predetermined code information; and an enabling unit configured to enable the first command for a period of time, when the authentication result has been successful.

Another embodiment according to the present invention is a printer that encrypts encryption target data to be encrypted. The printer includes: a key generating unit configured to generate an encryption key based on random data or data associated with the printer; an encrypting unit configured to encrypt the encryption target data, with the encryption key generated by the key generating unit, to generate encryption data; and an embedding unit configured to embed the encryption data generated by the encrypting unit, in a file resident in the printer.

Effects of the Invention

According to the present invention, printer security can be enhanced.

More specifically, according to an embodiment of the present invention, data required for encrypted communication can be securely downloaded via network to a printer. According to another embodiment of the present invention, printer security can be enhanced when the printer performs printing based on communication with an external apparatus.

DETAILED DESCRIPTION OF THE INVENTION

(1) Overview of Print System

Figure 1:
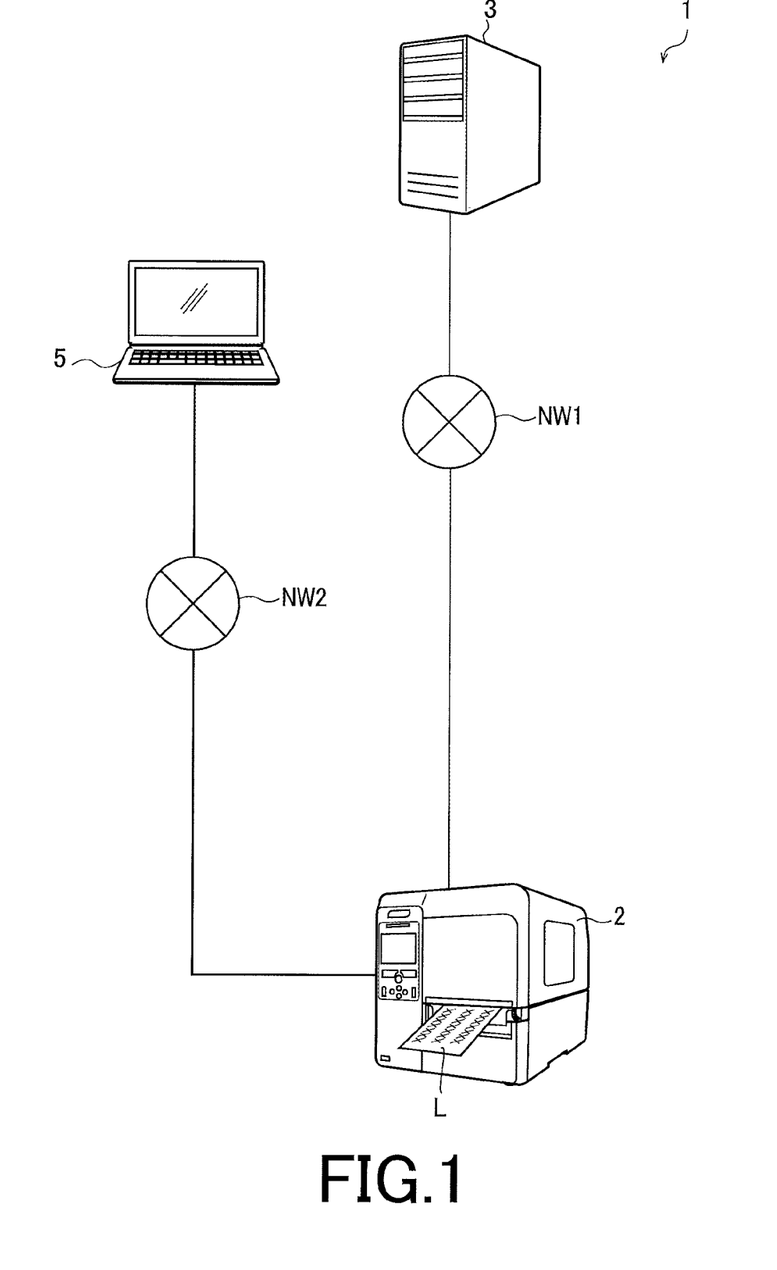
FIG. 1 shows a general system configuration of a print system according to an embodiment.

The print system 1 according to the present embodiment will be described below with reference to FIG. 1. FIG. 1 is a general system configuration of the print system 1 according to the present embodiment.

As illustrated in FIG. 1, the print system 1 according to the present embodiment includes a printer 2, a server 3, and an information processing apparatus 5. The printer 2 and the server 3 can communicate with each other via a network NW1. The printer 2 and the information processing apparatus 5 can communicate with each other via a network NW2. The printer 2 is connected to a router (not shown) with a cable, and communicates with the server 3 or the information processing apparatus 5 via the router. It is to be noted that the printer 2 may be connected to the router (not shown) wirelessly.

The printer 2 may be a label printer, for example. The server 3 is configured to determine a print content to be printed by the printer 2 on a label, and transmit print data indicative of the print content, to the printer 2. The printer 2 is configured to print based on the print data received from the server 3. Encrypted communication in compliance with Transport Layer Security (TLS) 1.2, etc. is applied to communication between the printer 2 and the server 3. In order to realize the communication in compliance with TLS 1.2, the printer 2 stores a server certificate and an encryption key. With the server certificate, the printer 2 functions as a socket server in the communication in compliance with TLS 1.2.

If the server certificate and the encryption key (collectively referred to hereinafter as "certificate files") were stored unencrypted in the printer 2, a malicious third party could steal the certificate files and get unauthorized access to the server 3 with the certificate files. Thus, in the print system 1 according to the present embodiment, the printer 2 stores the certificate files encrypted. An encryption method and a storing method for the certificate files will be described specifically later.

The certificate files may be preferably updated timely in order to enhance security. In an embodiment, the certificate files in the printer 2 may be updated by downloading the files from the information processing apparatus 5 to the printer 2. It is shown as an example in FIG. 1 that the network NW1 between the printer 2 and the server 3, and the network NW2 between the printer 2 and the information processing apparatus 5, are different; however, this is not always the case. The printer 2, the server 3, and the information processing apparatus 5 may be connected to a common network.

As illustrated in FIG. 1, when the printer 2 is connected to the network NW1 and the network NW2, it is configured that the printer 2 may be equipped with two LAN cards, or that the printer 2 may not be connected to the server 3 and the information processing apparatus 5 concurrently. When the printer 2 is connected to the server 3 and the information processing apparatus 5 concurrently, a router (not shown) may be installed for accessing the printer 2 from the outside.

An arrangement is required to enable secure download of the certificate files in the printer 2, such that a malicious third party is unable to steal or rewrite the certificate files. Such arrangement will be described later.

(2) Internal Structure of the Print System of the Present Embodiment

Figure 2:
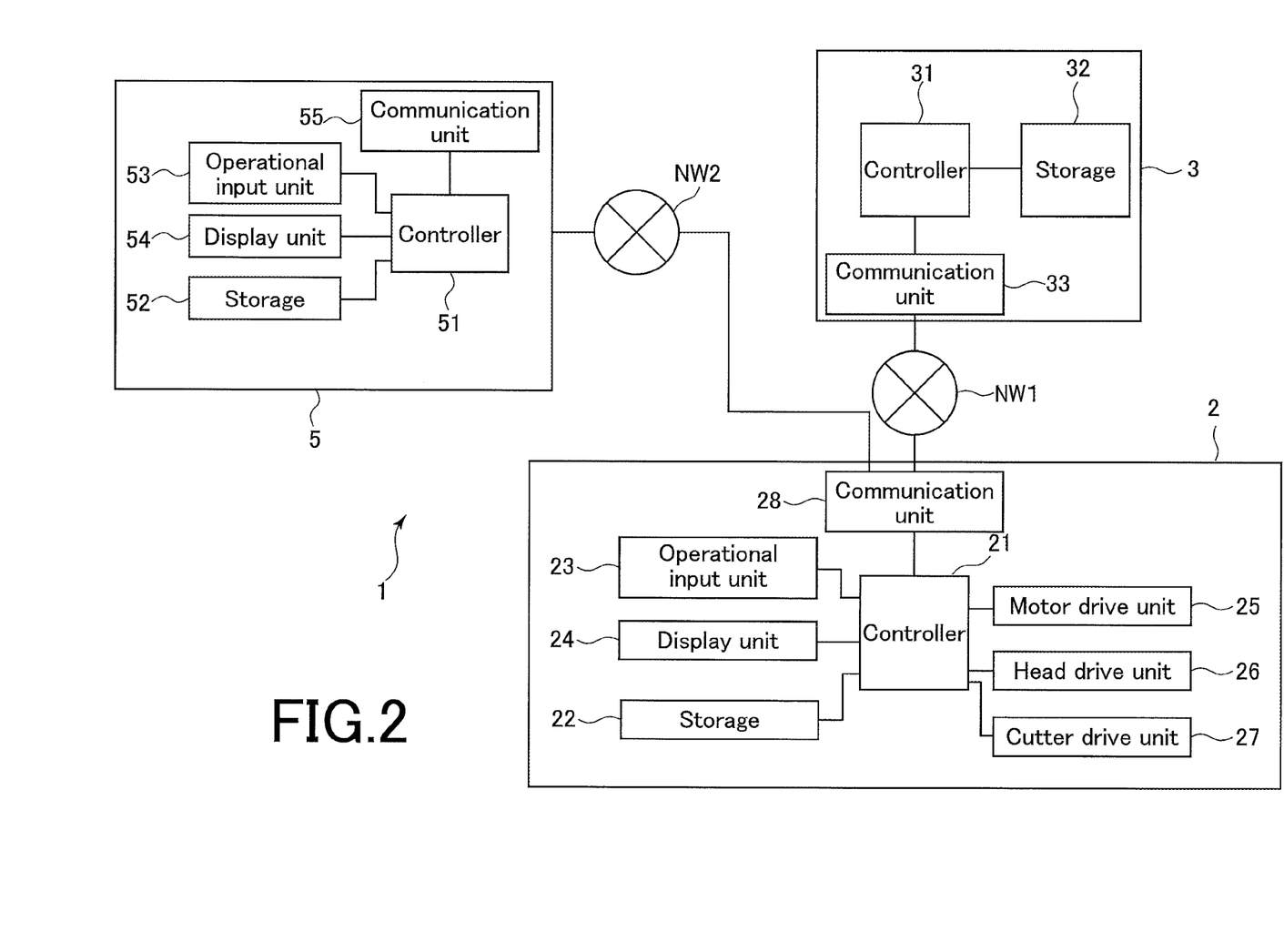
FIG. 2 shows a block diagram of the print system according to the embodiment.

Next, an internal structure of the print system 1 of the present embodiment will be described with reference to FIG. 2. FIG. 2 is a block diagram of the print system 1 according to the present embodiment.

As shown in FIG. 2, the printer 2 includes a controller 21, a storage 22, an operational input unit 23, a display unit 24, a motor drive unit 25, a head drive unit 26, a cutter drive unit 27, and a communication unit 28. A strip-shaped continuous paper is stored in the printer 2 by winding the continuous label body into a paper roll. The printer 2 draws the continuous paper from the paper roll, prints on the continuous paper, and then cuts the continuous paper in predetermined length to issue a label. Alternatively, the printer 2 may cut a continuous label body, which includes an adhesive layer on a back face thereof, in predetermined length to issue a label (i.e. linerless label). The printer 2 may cut a continuous label body, which includes a plurality of labels is temporarily attached to on a mount, by a single label, to issue a label.

The controller 21 mainly includes a microcontroller and memories (namely, a random access memory (RAM) and a central processing unit (CPU), a read-only memory (ROM), and a random access memory (RAM). When the printer 2 is activated, the CPU of the controller 21 loads and executes a variety of programs stored in the ROM, to control each part of the printer 2. The variety of programs includes a firmware. The RAM functions as a work area for the CPU and temporarily stores a variety of data. The controller 21 executes a variety of processing in order to perform communication with the server 3 in compliance with a communication protocol such as TLS1.2, in collaboration with the communication unit 28.

The CPU executes the programs, and thus, the controller 21 functions in the present embodiment as a processing unit, a disabling unit, a determining unit, an enabling unit, a generating unit, and an authentication result acquiring unit, which will be specifically described below.

The controller 21 functions as a processing unit configured to executing a command to perform the corresponding processing with regard to the printer 2. For example, when acquiring a command with regard to the printer 2 from an external apparatus, the controller 21 performs processing for setting change of the printer 2, or processing for controlling a status, an operation, or the like of the printer 2, in response to the command that have been acquired.

The controller 21 functions as a disabling unit configured to disable a command to acquire data from the information processing apparatus 5 for example (exemplary first command), among commands to execute predetermined processing with regard to the printer 2. In the printer 2 according to the present embodiment, when the printer 2 is activated, at least one or more control command(s) are disabled among control commands to control operations of the printer 2 from an external apparatus, for the sake of safety. The disabled command(s) include one to acquire (i.e. download) data from an external apparatus.

The controller 21 functions as a determining unit configured to determine whether an authentication result is successful based on predetermined code information. When the determining unit determines that the authentication result has been successful, the controller 21 functions as an enabling unit configured to enable the command to acquire data from an external apparatus such as the information processing apparatus 5. That is, the control command to download data from an external apparatus to the printer 2 is disabled when the printer 2 is activated, and that the control command is then enabled for a period of time, only if the authentication result has been successful based on the predetermined code information. During the period of time, the controller 21 is allowed to download, from the information processing apparatus 5, a server certificate and a private key for update.

As will be described, a one-time password (exemplary code information) for example may be used for authentication to enable the control command to download data to the printer 2. In this case, the controller 21 of the printer 2 functions as a generating unit configured to generate a one-time password in accordance with a predetermined method.

Authentication by use of a one-time password is performed by an authentication server (which will be described later). The controller 21 acquires, via the communication unit 28, an authentication result by the authentication server. That is, the controller 21 functions as an authentication result acquiring unit configured to acquire the authentication result with regard to the one-time password.

The CPU executes the programs, and thus, the controller 21 functions in the present embodiment as a key generating unit, an encrypting unit, an embedding unit, a decrypting unit, and a deleting unit. The controller 21 exerts these units, when encrypting the server certificate and the private key downloaded from the information processing apparatus 5, or when decrypting the server certificate and the private key immediately after activated. Each unit will be specifically described below.

The controller 21 functions as a key generating unit configured to generate an encryption key based on random data and data associated with the printer 2 (such as unique data to the printer 2). Random data may be preferably stored in an embedded state in a resident file in the printer 2. The resident file is a file which is not considered to be deleted from the printer 2, such as a system file, a font file, a file used by a resident application program, or the like. Embedding the random data in the resident file is performed to prevent an encrypted server certificate and an encrypted private file from being easily decrypted, when there is an unauthorized access to the printer 2 from the third party.

The controller 21 functions as an encrypting unit configured to encrypt the server certificate and the private file, with the encryption key generated by the key generating unit, to generate the encrypted server certificate and the encrypted private file. The encrypted server certificate and the encrypted private file are an example of the encryption data.

The controller 21 functions as an embedding unit configured to embed the encrypted server certificate and the encrypted private file, in a resident file in the printer 2. Embedding the server certificate and the private file in the resident file is performed to prevent the server certificate and the private file from being stolen, when there is an unauthorized access to the printer 2 from the third party.

In the present embodiment, when activated, the printer 2 decrypts the server certificate and the private file for performing encrypted communication with the server 3. At this time, the controller 21 functions as a decrypting unit configured to extract the random data from the resident file, and then decrypt the encrypted server certificate and the encrypted private file, with the random data.

The controller 21 functions as a deleting unit configured to delete the unencrypted server certificate and the unencrypted private file, after the encrypted server certificate and the encrypted private file have been generated.

The storage 22 is a storage device such as a solid state drive (SSD). The storage 22 stores the resident file and print format data, etc. The print format data is required in printing based on print data.

The operational input unit 23 includes an input device such as buttons and switches, which are operated by a user. The display unit 24 includes a display drive circuit for displaying data on a display panel. Such data may be inputted by the operational input unit 23. The display panel may preferably include a touch-panel input circuit, for example, for receiving an operational input through a touch-panel.

The motor drive unit 25 drives a motor that controls rotation of a platen roller (not shown) to feed the continuous paper. A feed amount and a feed direction are based on an instruction from the controller 21.

When receiving encrypted print data from the server 3, the controller 21 decrypts the print data. The controller 21 then generates graphic data to be printed on a label, and sequentially transmits line data to the head drive unit 26. The line data corresponds to each line of the graphic data.

The head drive unit 26 causes current to selectively flow through each heating element of a thermal head (not shown) based on the line data. The heating element(s) heated by the current flow are pushed by the platen roller to the fed continuous paper, and then color is developed at a portion of the continuous paper to which the heating element(s) are pushed, thereby printing information on the continuous paper. The cutter drive unit 27 drives a cutter (not shown) to cut a printed portion of the continuous paper, under a control of the controller 21. A label, which is obtained by cutting the paper, is sequentially ejected.

The communication unit 28 is an interface for communication with the server 3. The communication unit 28 may perform encrypted communication with the server 3 in accordance with TLS 1.2 for example.

As shown in FIG. 2, the server 3 includes a controller 31, a storage 32, and a communication unit 33.

The controller 31 includes a microcontroller as a main component to control operations of the server 3. For example, the controller 31 executes a variety of processing to perform communication with the printer 2 in compliance with a communication protocol such as TLS 1.2, in collaboration with the communication unit 33.

The storage 32 may be a large-sized storage device such as a hard disk drive (HDD) to store a variety of print data. The controller 31 generates print data or acquire print data from an external apparatus to store the print data in the storage 32.

When establishing a session in the communication with the printer 2, the controller 31 reads out print data from the storage 32, and transmits the print data to the printer 2. At this time, the controller 31 encrypts the print data by use of a session key (a common key), which is determined with the printer 2, and then transmits the print data to the printer 2.

The communication unit 33 is an interface for communication with the printer 2. The communication unit 33 may perform encrypted communication with the printer 2 in accordance with TLS 1.2 for example.

As shown in FIG. 2, the information processing apparatus 5 includes a controller 51, a storage 52, an operational input unit 53, a display unit 54, and a communication unit 55.

The controller 51 includes a microcontroller as a main component to control operations of the information processing apparatus 5. The storage 52 may be a storage device such as a SSD to store a server certificate of the printer 2, which has been acquired from a certificate authority, and a private key.

When the printer 2 updates the server certificate and the private key, the controller 51 transmits a control command to the printer 2 via the communication unit 55 before transmitting the server certificate and the private key. When transmitting the server certificate and the private key, the controller 51 reads out the server certificate and the private key from the storage 52.

The communication unit 55 is an interface for communication with the printer 2.

Figure 3:
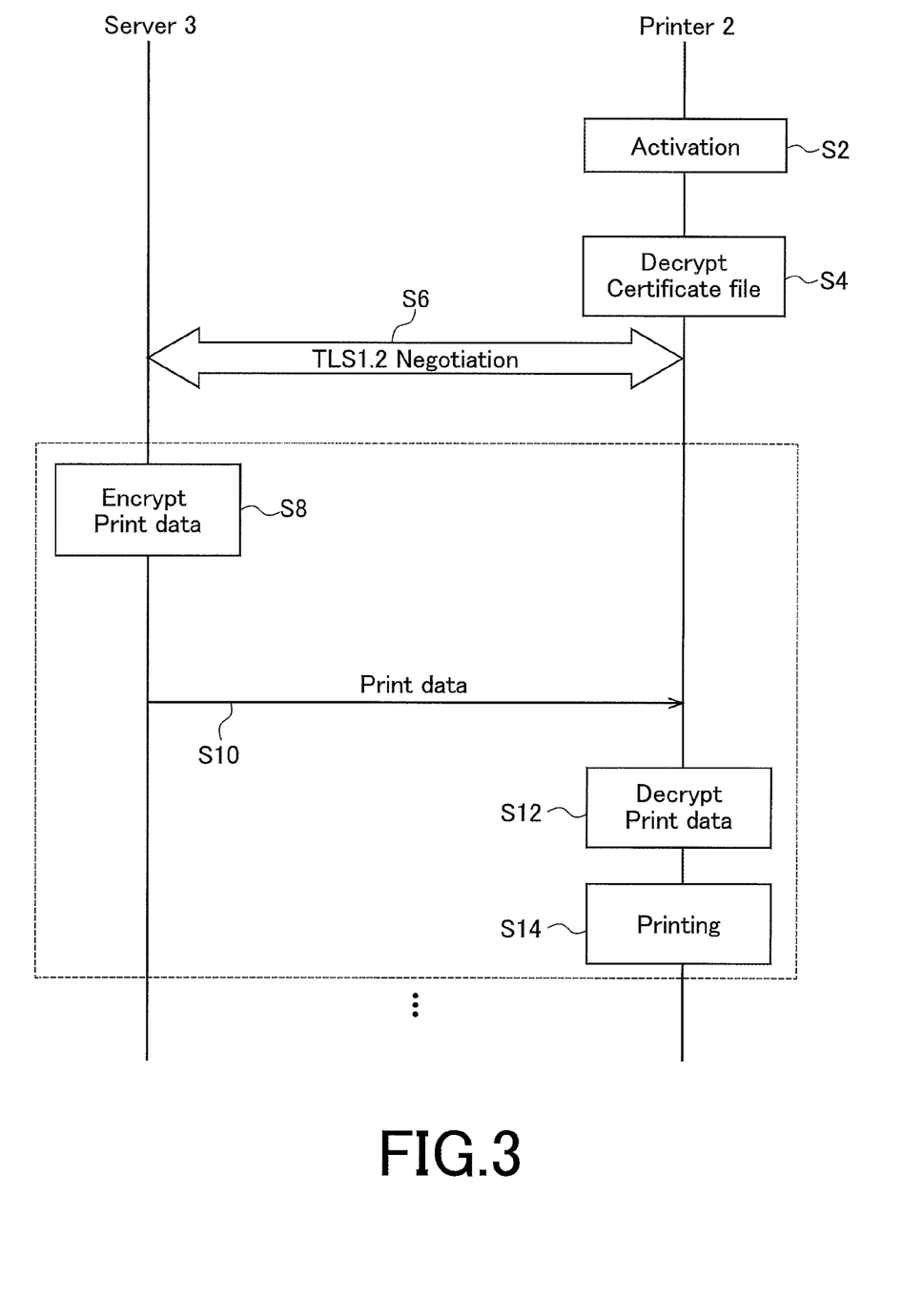
FIG. 3 is a sequence chart indicating a behavior of the print system according to the embodiment when a printer performs printing.

(3) System Behavior in the Present Embodiment when the Printer 2 Performs Printing Next, it will be described with reference to FIG. 3, a system behavior when the printer 2 performs printing through communication between the server 3 and the printer 2. FIG. 3 is a sequence chart indicating the behavior of the print system 1 according to the present embodiment when the printer 2 performs printing.

In FIG. 3, when activated (step S2), the printer 2 decrypts certificate files (i.e. a server certificate and a private key) in preparation for communication with the server 3 (step S4). As will be described later, in the printer 2 according to the present embodiment, the encrypted server certificate and the encrypted private key are included in a resident file of the printer 2. Further, random data is included in a resident file of the printer 2. The random data is used to generate encryption data with which the server certificate and the private key are decrypted. Thus, the controller 21 of the printer 2 extracts the random data from the resident file, and generates encryption data based on the random data or data associated with the printer 2 (such as unique data to the printer 2). The controller 21 of the printer 2 then extracts the encrypted server certificate and the encrypted private key from the resident file, and decrypt them with the encryption data that has been generated.

Negotiation process in step S6 is performed for authentication between the communication partners and determination of an algorithm. The algorithm is for executing encryption and a hash function. The negotiation process in compliance with TLS 1.2 is standardized by Internet Engineer Task Force (IETF), and may generally include the following steps.

(i) The server 3 transmits a notice to the printer 2 with regard to initiation of communication. The notice includes a protocol version (i.e. TLS 1.2), a list of algorithms of encryption methods and data compression methods that are available by the server 3, and a random number used for calculating a common key afterward.

(ii) The printer 2 notifies the server 3 of an encryption method and a data compression method to be used, and a server certificate.

(iii) The server 3 generates a random number, and encrypts the random number (pre-master secret), with a public key included in the server certificate from the printer 2. The server 3 transmits the encrypted pre-master secret to the printer 2. Since the pre-master secret can be decrypted with a secret key that the printer 2 has, the pre-master secret is shared between the server 3 and the printer 2.

(iv) Each of the server 3 and the printer 2 generates a master secret based on the random number shared at step (i) and the pre-master secret shared at step (iii). Each of the server 3 and the printer 2 then generates a common key (a session key) based on the master secret, with the identical method.

Once the negotiation has been completed, encryption of print data by the server 3 (step S8) and decryption of the received print data by the printer 2 (steps S10, S12) are performed by use of the common key (the session key) shared in the negotiation process. The printer 2 performs printing based on the decrypted print data (step S14).

Steps S8 to S14 are repeatedly performed in response to a print request from the server 3.

Figure 4:
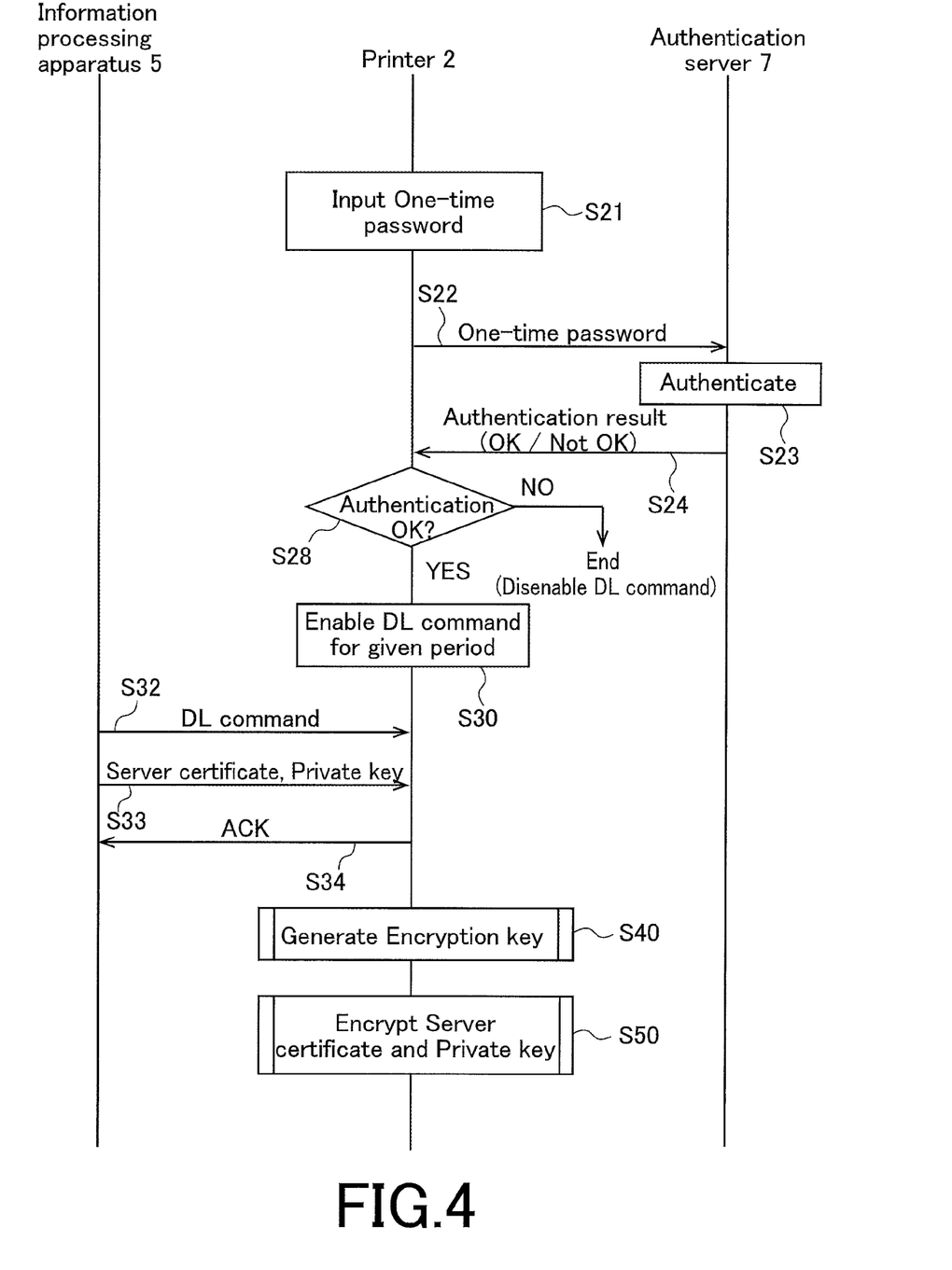
FIG. 4 is a sequence chart indicating a behavior of the print system according to the embodiment when a printer updates a server certificate and a private key.

(4) System Behavior in the Present Embodiment when the Printer 2 Updates Certificate Files Next, it will be described with reference to FIG. 4, a system behavior when the printer 2 updates certificate files. FIG. 4 is a sequence chart indicating a behavior of the print system 1 according to the present embodiment when the printer 2 updates a server certificate and a private key.

(4-1) Overall Behavior

FIG. 4 indicates a process that the printer 2 downloads a server certificate and a private key for update from the information processing apparatus 5, and encrypts the server certificate and the private key. The process of FIG. 4 is performed based on an update instruction by a user.

It is to be noted that, in FIG. 4, an authorization server 7 performs authorization based on a one-time password transmitted from the printer 2.

The printer 2 according to the present embodiment disables a control command to acquire data from an external apparatus, when activated. The printer 2 then enables the control command to acquire data from an external apparatus for a period of time, only if particular authentication has been successful. This enables secure download of the server certificate and the private key from the information processing apparatus 5. In an example of FIG. 4, the particular authentication corresponds to authentication processing by use of a one-time password.

First, a user of the printer 2 generates a one-time password by use of a hardware token (generally referred to also as "dongle"). The printer 2 then receives an input of the one-time password based on an operational input to the operational input unit 23 by the user (step S21). It should be noted that a software token may be also used to generate a one-time password. The software token is a software having the same function as a hardware token. Generally, the software token can be executed in a mobile terminal or on a web browser.

The printer 2 transmits the one-time password, which have been inputted, to the authorization server 7 (step S22). The authorization server 7 executes authorization processing based on the one-time password received from the printer 2 (step S23).

The particular authorization method based on the one-time password at step S23 is not a limiting example. A variety of authorization methods may be applied as an authentication method.

For example, when a time-synchronized one-time password is applied, a hardware token generates a one-time password based on time when an operation is performed, in accordance with an algorithm. The authorization server 7, which receives the one-time password from the printer 2, also generates a one-time password based on time when the one-time password is received, in accordance with the same algorithm as the hardware token. It is determined that authorization is OK when the both one-time passwords match. It is determined that authorization is not OK when the both one-time passwords do not match.

Alternatively, when a mathematical algorithm is applied to generate a one-time password, a hardware token uses a plurality of passwords sequentially generated by a mathematical algorithm. An authorization server also performs authentication processing by sequentially using a plurality of passwords generated by the same mathematical algorithm as that used for the hardware token. In the same manner, it is determined that authorization is OK when the both one-time passwords match; it is determined that authorization is not OK when the both one-time passwords do not match.

Alternatively, challenge-response one-time passwords may be applied for an authorization method.

The authorization server 7 transmits an authorization result (OK or Not OK) based on the on-time password, to the printer 2 (step S24). If the authorization result, which has been received at step S24, is not OK (step S28: NO), then the printer 2 does nothing. Consequently, the printer 2 is unable to download data from the information processing apparatus 5, even when receiving a control command to acquire data from the information processing apparatus 5 (referred to hereinafter as "DL command" as appropriate) afterwards. The DL command is an example of a first command.

If the authorization result, which has been received at step S24, is OK (step S28: YES), then the printer 2 enables the DL command for a period of time (step S30). When the information processing apparatus 5 for example transmits a DL command to the printer 2 during the period of time (step S32), the printer 2 is able to download a server certificate and a private key from the information processing apparatus 5 (step S33). When the download of the server certificate and the private key has been completed without an error, the printer 2 transmits an ACK message to the information processing apparatus 5 (step S34).

When having received the server certificate and the private key without an error, the printer 2 encrypts the server certificate and the private key so that an unauthorized third party will not access them. The encryption of the server certificate and the private key may include: processing of generating an encryption key required for the encryption (step S40); and processing of encrypting the server certificate and the private key with the encryption key that have been generated (step S50).

Steps S40 and S50 are performed by the controller 21 of the printer 2.

(4-2) Processing of Generating Encryption Key

Figure 5:
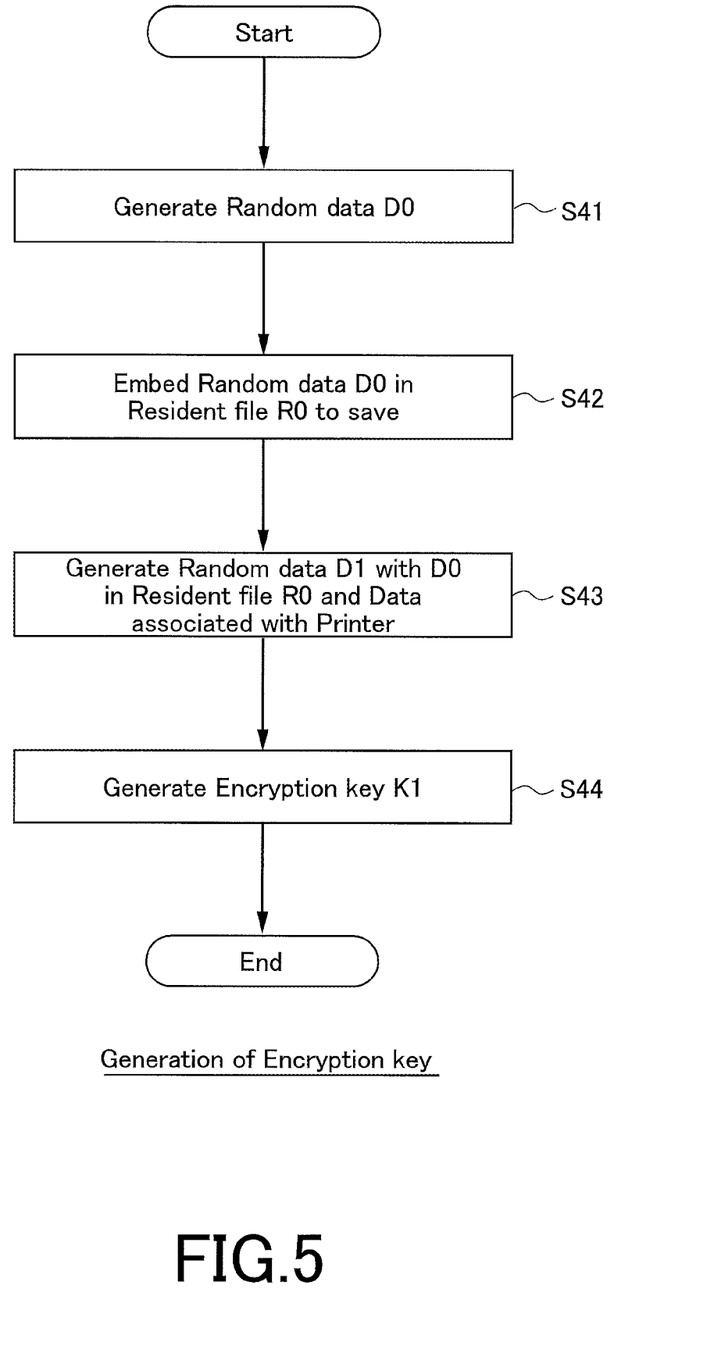
FIG. 5 is a flowchart for the printer to generate an encryption key used to encrypt the server certificate and the private key.
Figure 6:
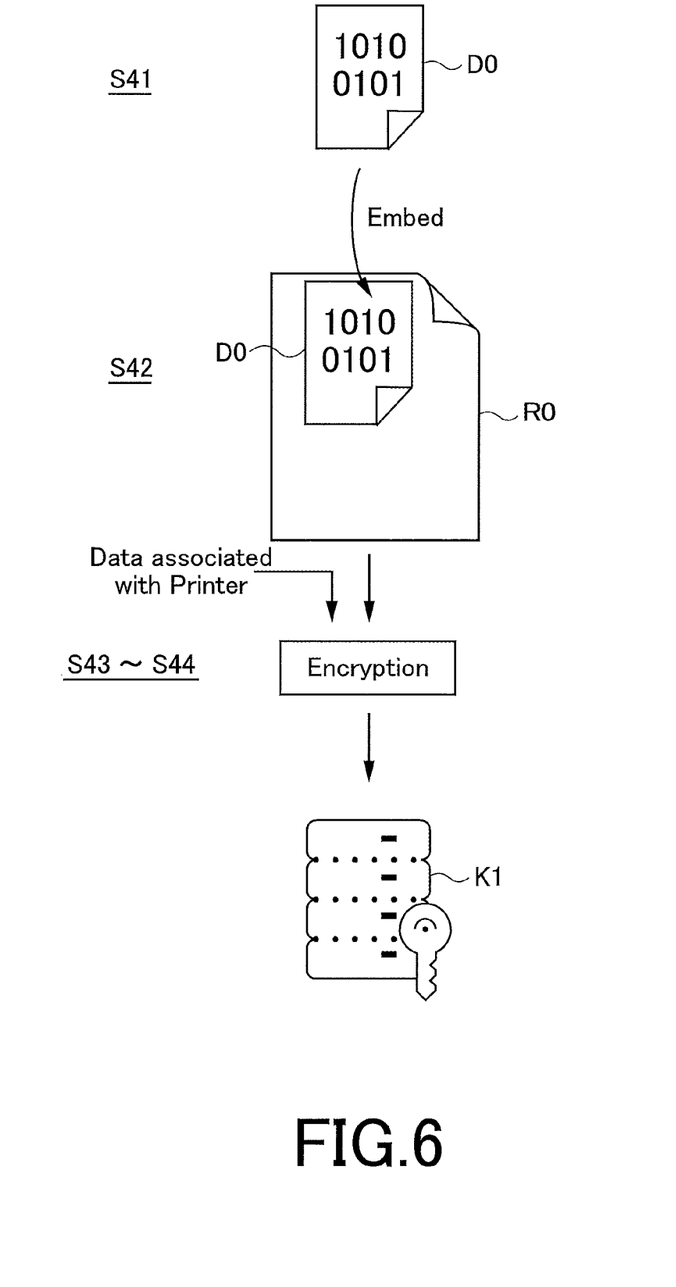
FIG. 6 schematically shows a process for the printer to generate the encryption key used to encrypt the server certificate and the private key.

The processing of generating an encryption key at step S40 will be described with reference to FIGS. 5 and 6 in more details. FIG. 5 is a flowchart for the printer 2 of the present embodiment to generate an encryption key used to encrypt the server certificate and the private key. FIG. 6 schematically shows a process for the printer 2 of the present embodiment to generate the encryption key used to encrypt the server certificate and the private key. FIG. 6 includes signs of steps corresponding to those in FIG. 5.

First, the controller 21 of the printer 2 generates random data D0 (step S41). The random data D0 is generated every time the server certificate and the private key are updated. The controller 21 then embeds the generated random data D0 in a resident file R0 for data camouflage (step S42). The resident file R0 may be a system file, a font file, or a file used in a resident application program, etc. The controller 21 records the resident file R0 including the random data D0 in the storage 22 so that it can decrypt afterwards the server certificate and the private key. The random data D0 is saved embedded in the resident file R0, thereby reducing possibility that the random data D0 is leaked to the outside, even if an unauthorized third party tries to access the printer 2.

Next, the controller 21 generates random data D1 based on: the random data D0 included in the resident file R0; and data associated with the printer 2 (such as unique data to the printer 2) (step S43). The data associated with the printer 2 is preferably unique one allocated to the printer 2. Nevertheless, the data associated with the printer 2 may be any data, as long as there is a low probability that the data is commonly allocated to different printers. An example of the former data may be identification information for identifying the printer 2, such as a serial number, a manufacturing number, or the like. An example of the latter data may be a manufacturing lot number, an order number, an inventory management number, or the like.

By using the data associated with the printer 2 during the process for generating the encryption key, there is an advantage that, even if an encryption key of a printer is leaked, a situation is prevented that an encryption key of the other printer is leaked as well.

The controller 21 then performs calculation based on a hash function with regard to the random data D1 to generate an encryption key K1 (step S44).

(4-3) Processing of encrypting Server certificate and Private key

Figure 7:
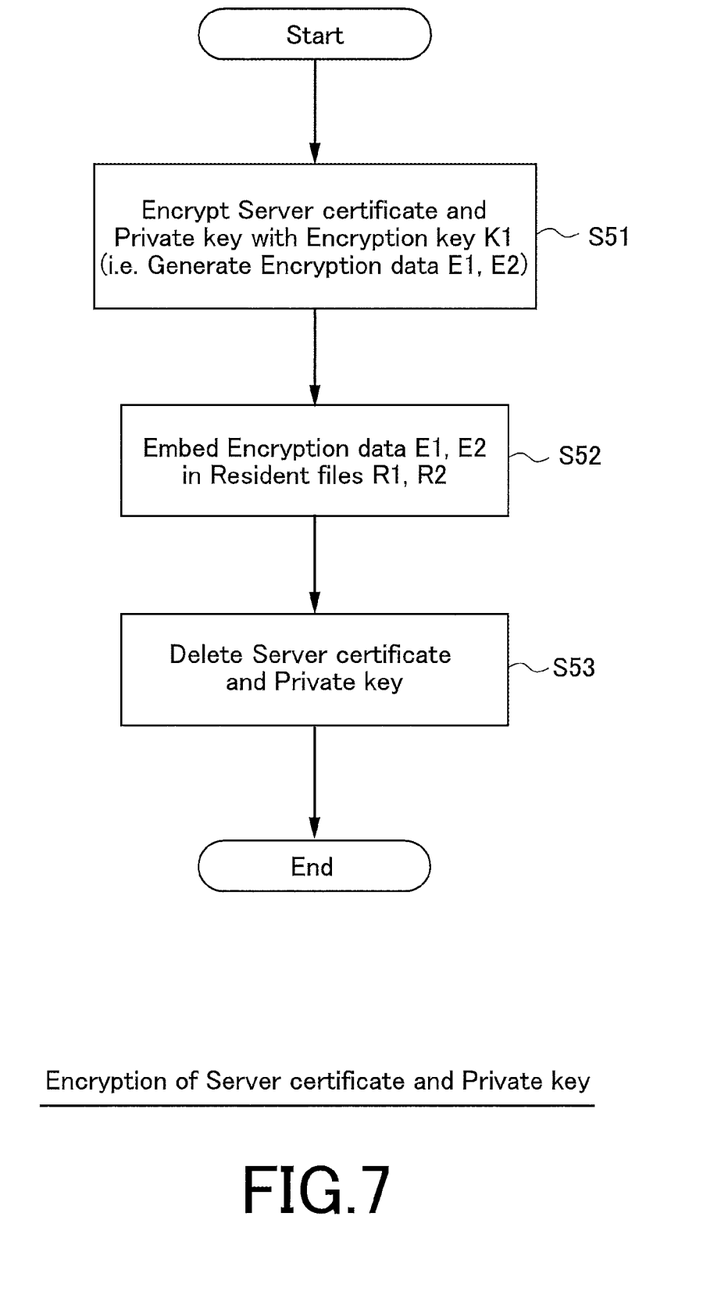
FIG. 7 is a flowchart for the printer to encrypt the server certificate and the private key.
Figure 8:
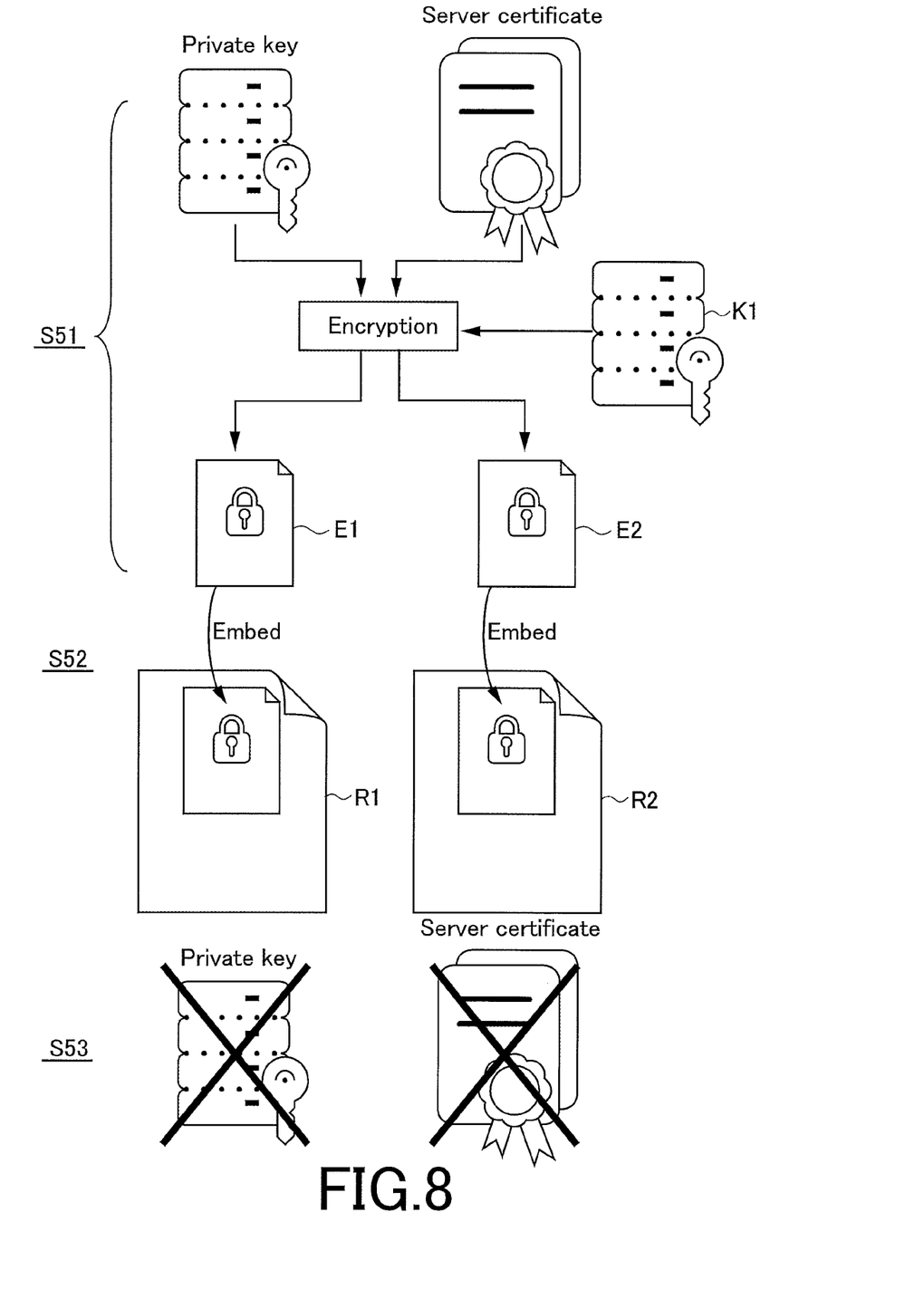
FIG. 8 schematically shows a process for the printer to encrypt the server certificate and the private key.

The processing at step S50 of encrypting the server certificate and the private key will be described in more details with reference to FIGS. 7 and 8. FIG. 7 is a flowchart for the printer 2 of the present embodiment to encrypt the server certificate and the private key. FIG. 8 schematically shows a process for the printer 2 of the present embodiment to encrypt the server certificate and the private key. FIG. 8 includes signs of steps corresponding to those in FIG. 7.

The controller 21 of the printer 2 encrypts the server certificate and the private key, which have been received from the information processing apparatus 5, with the encryption key K1 generated at step S44 (step S51). The encryption method may be, but not limited to, Advanced Encryption Standard (AES) 256, for example. Here, a key length may not be 256 bits. In FIG. 8, the encrypted server certificate and the encrypted private key correspond to encrypted data E1 and encrypted data E2 respectively.

The controller 21 then embeds the encrypted data E1, E2 in resident files R1, R2 of the printer 2 respectively (step S52). One of the resident files R1, R2 may be identical to the resident file R0, in which the random D0 has been embedded in the process of generating the encryption key K1 (see step S42 in FIG. 5). However, the resident files R1, R2 may be preferably different from the resident file R0 in order to prevent data embedded in these resident files from being leaked concurrently.

After the encrypted data E1, E2 have been embedded in the resident files R1, R2 for data camouflage, the controller 21 deletes the server certificate and the private key that have not been encrypted, to make sure that they are not stolen by the third party (step S53).

As described above, the printer 2 according to the present embodiment enables, for a period of time, a control command to acquire data from the information processing apparatus 5, only if an authentication result has been successful. Thus, when updating the server certificate and the private key, the printer 2 is able to securely download a new server certificate and a new private key from the information processing apparatus 5.

As described above, the printer 2 according to the present embodiment may generate an encryption key for encrypting a server certificate and a private key, based on data associated with the printer 2. Thus, even when an encryption key of the other printer has been leaked, the situation is prevented that the encryption key of the printer 2 is leaked as well. Thereby, the server certificate and the private key can be stored securely.

Random data for generating the encryption key, the encrypted server certificate, and the encrypted private key are embedded in resident files of the printer 2 for data camouflage. Thus, when a malicious third party accesses the printer 2, it is difficult for him or her to find the random data, or the encrypted server certificate and the encrypted private key in the printer 2.

(5) Modified Examples

Modified examples of the aforementioned print system 1 according to the present embodiment will be described below.

(5-1) Modified Example 1

Figure 9:
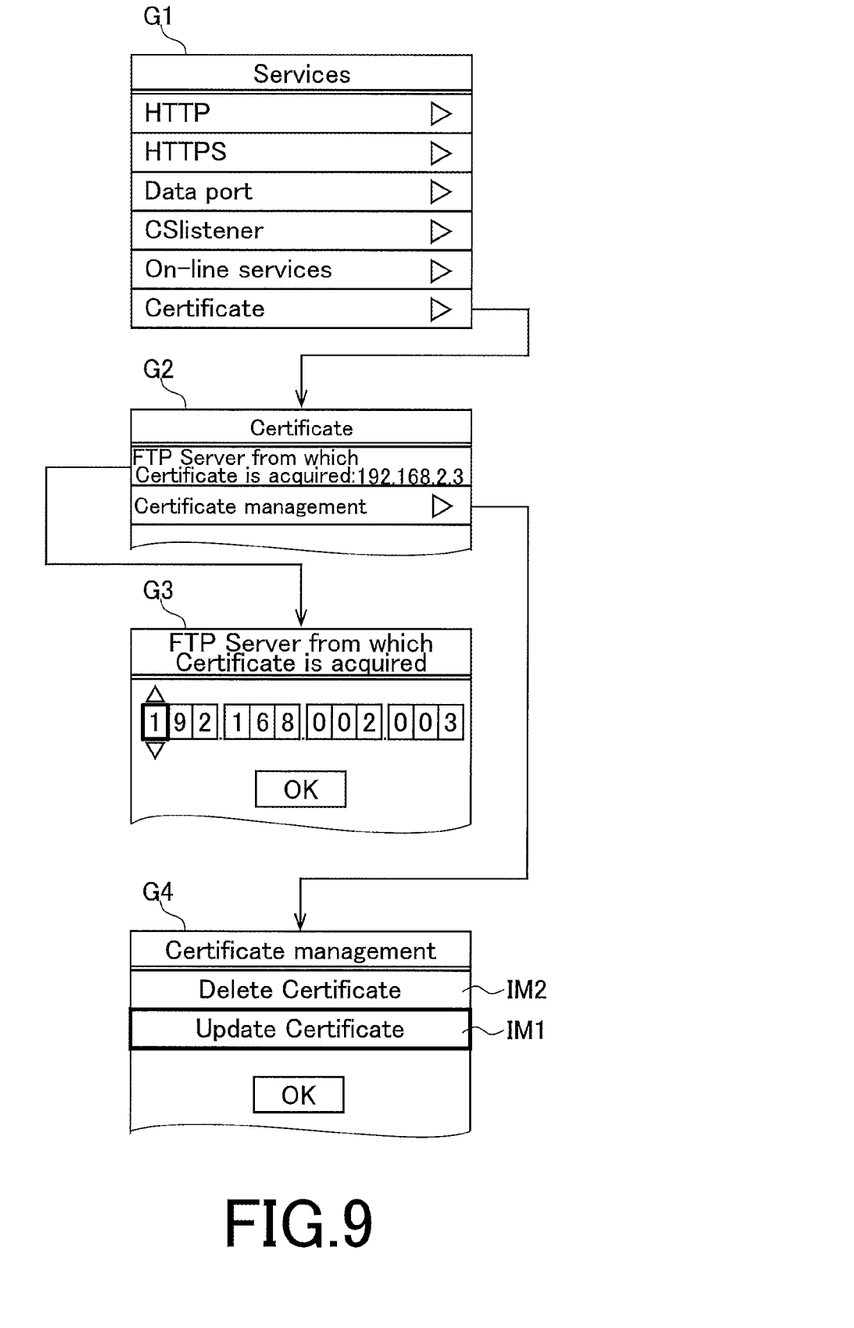
FIG. 9 is a view explaining another method when a printer according to a modified example updates the server certificate and the private key.

Update of the certificate files may be actively performed based on an operational input of a user to the printer 2. This method of updating the certificate files will be described with reference to FIG. 9. FIG. 9 is a view explaining another method when the printer 2 updates the server certificate and the private key.

FIG. 9 shows transition of a displayed screen on the display unit 24 of the printer 2. A screen G1 shows selections of a plurality of items relating to communication provided at the printer 2. When updating certificate files, a user selects the item "Certificate" on the screen G1.

Upon selection of the item "Certificate" on the screen G1, a screen G2 is displayed. The screens G2 and G3 are ones for setting a FTP server from which the certificate is acquired. The screen G2 is displayed again by selecting the item "FTP Server from which Certificate is acquired" on the screen G2, inputting an IP address of the FTP server on the screen G3, and then operating an "OK" button. Subsequently, when an operation is performed to select the item "Certificate management" on the screen G2, a screen G4 is displayed.

The screen G4 includes an item IM1 displayed as "Update Certificate" and an item IM2 displayed as "Delete Certificate." When the "OK" button is operated with the item IM1 being selected, the controller 21 of the printer 2 transmits, via the communication unit 28, an update request message to the FTP server which is set on the screen G3, and receives certificate files from the FTP server. After having received the certificate files, the controller 21 executes steps S40, S50, as shown in FIG. 4.

With the present example, the certificate files can be updated actively based on an operational input by a user to the printer 2.

When the "OK" button is operated with the item IM2 being selected, on the screen G4 of FIG. 9, the controller 21 of the printer 2 deletes encrypted certificate files. In this case, the controller 21 extracts an encrypted server certificate and an encrypted private key from resident files embedded therein, and then deletes the server certificate and the private key. That is, the controller 21 functions as a second deleting unit configured to delete the server certificate and the private key based on an operational input.

Since the encrypted certificate files are actively deleted by a user, the server certificate and the private key are prevented from being leaked after encrypted communication is no longer necessary.

(5-2) Modified Example 2

Figure 10:
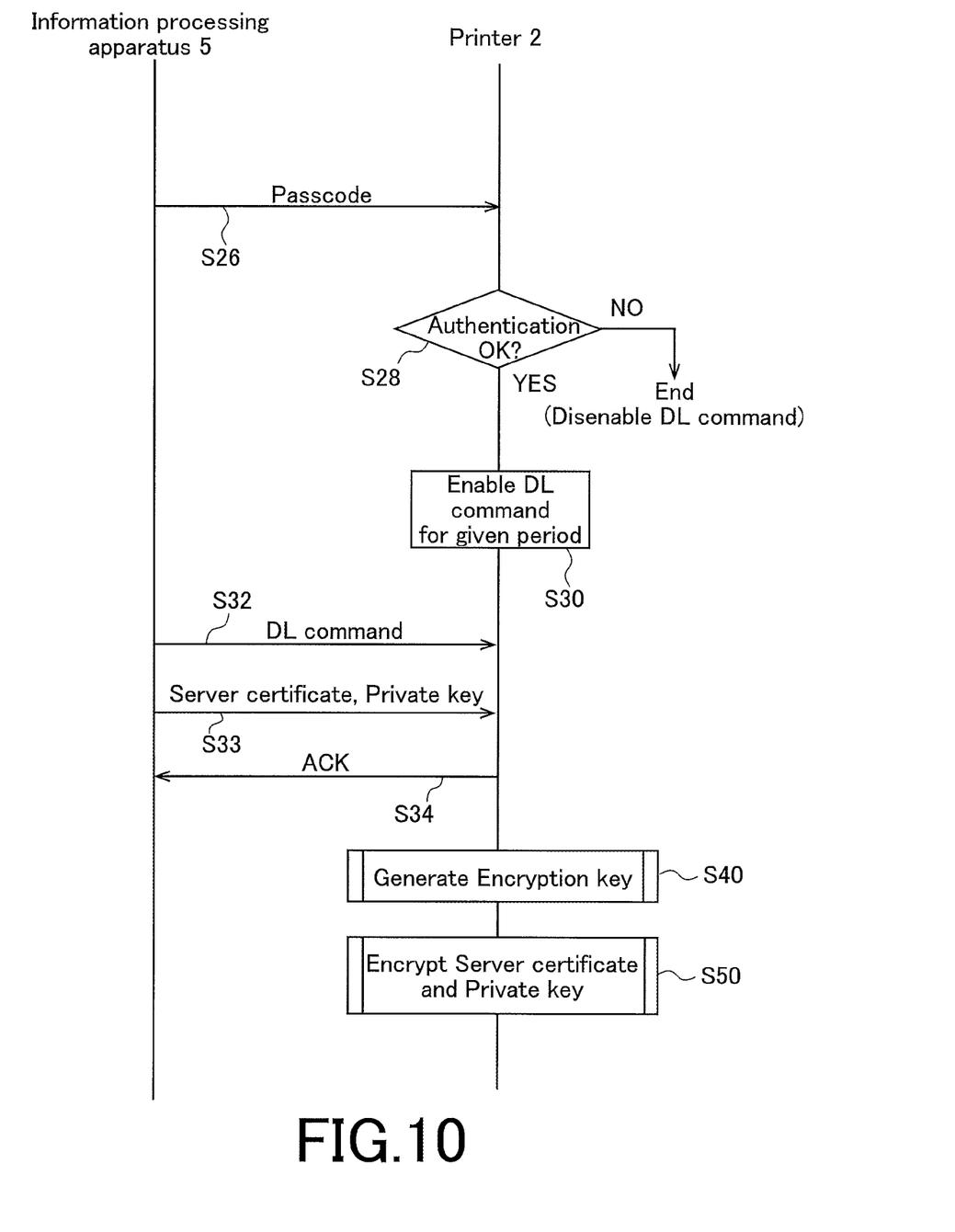
FIG. 10 is a sequence chart indicating a behavior of the print system according to a modified example when the printer updates the server certificate and the private key.

In the aforementioned embodiment, it has been described with reference to FIG. 4 that authorization using a one-time password is performed to enable, for a period of time, a control command (i.e. DL command) to acquire data. An example will be explained with reference to FIG. 10 that other authorization is performed. FIG. 10 is a sequence chart indicating a behavior of the print system according to a modified example when the printer 2 updates the server certificate and the private key.

In the sequence chart of FIG. 10, different from FIG. 4 is that the information processing apparatus 5 transmits a passcode (exemplary code information) to the printer 2. The printer 2 performs authentication of the passcode. The passcode transmitted from the information processing apparatus 5 to the printer 2 may be any code with which the printer 2 is able to authenticate. For example, the passcode may be one that is set at provisioning of the printer 2. In the present example, by the CPU executing a program, the controller 21 functions as a code information acquiring unit configured to acquire a passcode as code information from the information processing apparatus 5.

When the passcode received at step S26 matches a preset passcode, the controller 21 of the printer 2 determines that authorization is OK. When the passcode received at step S26 does not match a preset passcode, the controller 21 of the printer 2 determines that authorization is not OK (step S28). Step S30 and steps thereafter are same as FIG. 4.

The present modified example is the same as the aforementioned embodiment in that, only when predetermined authorization has been successful, a control command to acquire data from the information processing apparatus 5 is enabled for a period of time. Thus, a server certificate and a private key can be downloaded securely. Further, the printer 2 acquires code information, as a basis for authorization, from an originating apparatus of the server certificate and the private key, until the printer 2 performs authorization. Thus, the printer 2 is able to determine whether the control command is enabled or disabled for each originating apparatus, even during the period of time.

(5-3) Modified Example 3

In the aforementioned embodiment, it is preferable that a communication port of the printer 2 may be able to be set as enabled or disabled by software. In this case, the controller 21 of the printer 2 may function as a setting unit configured to enable or disable the communication port based on an operational input. In a case in which the printer 2 has a plurality of communication ports, it is preferable that each communication port can be independently set as enabled or disabled. At least a part of the plurality of communication ports is set as disabled, depending on usage conditions of a user. Thereby, it becomes possible to increase likelihood that access to the printer 2 from a malicious third party is blocked.

An operation on the screen G1 of FIG. 9 may be able to perform setting of the communication port as enable or disable. For example, by selecting an item "Data port" on the screen G1, the communication port can be set as enable or disable.

It should be noted that, in the aforementioned embodiment and the aforementioned modified examples, the print data, which has been received from the server 3 and stored in the storage 22, and the graphic data generated based on the print data, are preferably deleted after completion of printing, thereby further enhancing security for printing.

The embodiment of the present invention has been described in details. However, scope of the present invention is not limited to the aforementioned embodiment described above. The aforementioned embodiment may be improved or modified in a variety of ways to such an extent that does not depart from the spirit of the present invention.

For example, in the aforementioned embodiment, an example has been described that data acquired by the printer from the external apparatus (acquisition target data) and encryption target data are a server certificate and a private key; however, this is not always the case. Acquisition target data and encryption target data can be any data.

In the aforementioned embodiment, an example has been described that the server 3 and the information processing apparatus 5 are separately provided; however, this is not always the case. The server 3 may include the functions of the information processing apparatus 5.

The invention claimed is:

1. A printer capable of communicating with an external apparatus, the printer comprising a processor configured to:
   execute one of commands to perform corresponding processing with regard to the printer;
   disable a first command among the commands, the first command being to acquire data from the external apparatus;
   determine whether an authentication result is successful based on predetermined code information;
   when the authentication result has been successful, enable the first command for a period of time, and disable the first command after the period of time has elapsed, the period of time being set with respect to the first command; and
   when the first command is received from the external apparatus within the period of time, acquire, from the external apparatus, data required for encrypted communication, and encrypt the data by use of an encryption key generated based on random data and identification data associated with the printer.

2. The printer according to claim 1, wherein the processor is further configured to:
   generate a one-time password as the code information; and
   acquire the authentication result, the authentication result being an authentication result with regard to the one-time password generated by the processor.

3. The printer according to claim 1, wherein the processor is further configured to:
   acquire the code information from the external apparatus, and
   enable the first command from the external apparatus, when the authentication result for the code information acquired by the processor has been successful.

4. The printer according to claim 1, wherein the processor is further configured to enable or disable a communication port based on an operational input.

5. A communication method for a printer to communicate with an information processing apparatus, the method comprising:
   disabling a first command among commands for performing processing with regard to the printer, the first command being to acquire data from the information processing apparatus;
   determining whether an authentication result is successful based on predetermined code information;
   when the authentication result has been successful, enabling the first command for a period of time, and disabling the first command after the period of time has elapsed, the period of time being set with respect to the first command; and
   when the first command is received from the external apparatus within the period of time, acquiring, from the external apparatus, data required for encrypted communication, and encrypting the data by use of an encryption key generated based on random data and identification data associated with the printer.

6. A non-transitory computer-readable recording medium including a program, the program enabling a computer to perform a method when installed in a printer, the method comprising:
   disabling a first command among commands for performing processing with regard to the printer, the first command being to acquire data from an information processing apparatus;
   determining whether an authentication result is successful based on predetermined code information;
   when the authentication result has been successful, enabling the first command for a period of time, and disabling the first command after the period of time has elapsed, the period of time being set with respect to the first command; and
   when the first command is received from the external apparatus within the period of time, acquiring, from the external apparatus, data required for encrypted communication, and encrypting the data by use of an encryption key generated based on random data and identification data associated with the printer.

* * * * *